United States Patent [19]

Hosoya et al.

[11] Patent Number: 5,038,735
[45] Date of Patent: Aug. 13, 1991

[54] KNOCK SUPPRESSION APPARATUS AND METHOD FOR A MULTI-CYLINDER INTERNAL COMBUSTION ENGINE

[75] Inventors: Yasuhiko Hosoya; Toshio Iwata, both of Himeji, Japan

[73] Assignee: Mitsubishi Denki Kabushiki Kaisha, Tokyo, Japan

[21] Appl. No.: 603,351

[22] Filed: Oct. 26, 1990

[30] Foreign Application Priority Data

Oct. 30, 1989 [JP] Japan .................................. 1-279928
Oct. 2, 1990 [JP] Japan .................................. 2-263044

[51] Int. Cl.$^5$ .............................................. F02P 5/14
[52] U.S. Cl. .................................................. 123/425
[58] Field of Search ............... 123/425, 422, 417, 435; 364/431.03, 431.07, 431.08

[56] References Cited

U.S. PATENT DOCUMENTS

| | | | |
|---|---|---|---|
| 4,766,545 | 6/1988 | Nagai ............................ | 364/431.08 |
| 4,884,206 | 11/1989 | Mate ............................. | 364/431.08 |
| 4,892,074 | 1/1990 | Iriyama .......................... | 123/425 |
| 4,969,441 | 11/1990 | Komurasaki et al. ............. | 123/425 |
| 4,971,010 | 11/1990 | Iwata ............................ | 123/435 |
| 4,991,553 | 2/1991 | Kuribara et al. ................. | 123/425 |
| 4,993,387 | 2/1991 | Sakakibara et al. .............. | 123/425 |
| 4,993,388 | 2/1991 | Mitsumoto ...................... | 123/425 |

Primary Examiner—Raymond A. Nelli
Attorney, Agent, or Firm—Sughrue, Mion, Zinn, Macpeak & Seas

[57] ABSTRACT

An improved knock suppression apparatus and method for an internal combustion engine is able to determine whether knocking is taking place in each of the engine cylinders through a microcomputer, reduce the load on the hardware components employed and simplify the arrangement thereof to a substantial extent. To this end, it is determined whether knocking is taking place in each cylinder. It is further determined whether such knock determination is incorrect due to noise. If the knock determination is correct, then the knocking cylinder alone is subject to knock control such as ignition timing retarding control so as to suppress the knocking. On the other hand, if incorrect, the knock control on the cylinder is suppressed.

8 Claims, 7 Drawing Sheets

KNOCK SUPPRESSION APPARATUS AND METHOD FOR A MULTI-CYLINDER INTERNAL COMBUSTION ENGINE

BACKGROUND OF THE INVENTION

The present invention relates to a knock suppression apparatus and method for a multi-cylinder internal combustion engine which can detect knocking in each of the engine cylinders and retard the ignition timing of a knocking cylinder(s) so as to suppress the knocking therein. More particularly, it relates to a knock suppression apparatus and method which can prevent improper or incorrect control on the respective cylinders due to the influences of noise.

FIG. 7 shows a typical conventional knock suppression apparatus for an internal combustion engine which comprises a knock sensor 1 in the form of an acceleration sensor and the like installed on an engine for sensing knocking in the engine, e.g., for sensing engine accelerations due to knocking and generating a corresponding electrical output signal, a knock detecting circuit 2 for identifying signals due to the knocking in the output signal of the knock sensor 1 and generating an output signal of an analog form when knocking is detected, an analog to digital (A/D) converter 3 for converting the analog output signal of the knock detecting circuit 2 into a digital signal, and a microcomputer 4 including an ignition timing controller 5 connected to receive the digital signal from the A/D converter 3 for controlling the ignition timing of the engine in an appropriate manner so as to suppress knocking in the engine. The knock detecting circuit 2 includes a band-pass filter 22 for filtering a particular frequency band of the output signal of the knock sensor 1, a gate circuit 23 operable through the action of a mask signal from the microcomputer 4 to pass specific portions of the output signal of the band-pass filter 22, a BGL circuit 24 connected to receive the output signal of the gate circuit 23 for generating an output signal of a background level, a comparator 25 having a first input terminal connected to receive the output signal of the gate circuit 23 and a second input terminal which is supplied with the output signal of the BGL circuit 24 for making a comparison between these input signals, and an integrator 26 having an input terminal coupled to the output terminal of the comparator 25 and an output terminal coupled to the input terminal of the A/D converter 3 for integrating the output signal of the comparator 25 and outputting an analog signal, the integrator 26 further having a reset terminal coupled to the microcomputer 4 such that it is reset by a reset signal from the microcomputer 4.

The conventional knock suppression apparatus as constructed above operates as follows. First, the knock sensor 1 generates an output signal which is input to the band-pass filter 22 where a specific frequency band thereof is filtered and passed to the gate circuit 23. The gate circuit 23, which has a gate control terminal supplied from the microcomputer 4 with a mask signal containing square pulses occurring at predetermined intervals, operates to mask the output signal of the knock sensor 1 as filtered through the band-pass filter 2 in such a manner that those portions of the mask signal are removed to provide an output signal which contains no pulse at locations corresponding to the respective square pulses. The output signal of the gate circuit 23 is input to the first input terminal of the comparator 25, and at the same time it is imposed on the input terminal of the BGL circuit 24 so that the BGL circuit 24 produces an output signal having a predetermined background voltage level. The background level voltage of the BGL circuit 24 is imposed on the second input terminal of the comparator 25 and compared with the output signal of the gate circuit 23 which is fed to the first input terminal of the comparator 25 so that the comparator 25 generates an output signal when the output signal of the gate circuit 23 is higher than the background voltage level. The output signal of the comparator 25 is fed to the integrator 26 which performs integration to generate an output signal. In this regard, it is to be noted that although not illustrated in FIG. 7, in case of a multicylinder internal combustion engine, a plurality of knock sensors 1 are employed one for each engine cylinder, and the output signals of the respective knock sensors 1 are fed to the integrator 26 in a parallel relation with each other through the band-pass filter 22, the gate circuit 23 and the comparator 25 so that they are respectively integrated by the integrator 26 to provide corresponding output signals. To this end, the microcomputer 4 feeds a reset signal for each knock sensor output to the reset terminal of the integrator 26 at an appropriate timing. The integrated output signal of the analog form of the integrator 26 is then fed to the A/D converter 3 and converted there into a digital signal $V_R$ which in turn is read into the microcomputer 4 where, based on the digital signal $V_R$, the ignition timing controller 5 calculates an appropriate knock-suppression retard angle $\theta_R$ using the following formula:

$$\theta_R = V_R \times N$$

where N is a modification coefficient.

With the above mentioned conventional knock suppression apparatus, however, the hardware components such as the knock detecting circuit 2, etc., takes care of the entire signal processing of determining whether or not there is knocking in the engine. Such a processing requires a rather complicated circuit arrangement and a tremendous load on the part of the hardware components, resulting in high manufacturing costs.

SUMMARY OF THE INVENTION

Accordingly, the present invention is intended to obviate the above-mentioned problems of the prior art.

An object of the present invention is to provide an improved knock suppression apparatus and method for a multi-cylinder internal combustion engine which are able to perform knock determination by means of a microcomputer, thereby reducing the number of and the load on the hardware components employed and simplifying the arrangement thereof to a substantial extent.

Another object of the present invention is to provide an improved knock suppression apparatus and method for a multi-cylinder internal combustion engine which are able to discriminate knocking from noise and perform noise determination for each cylinder so as to prevent reduction in engine control efficiency due to misidentification of noise and knocking.

In order to achieve the above objects, according to one aspect of the present invention, there is provided a knock suppression apparatus for a multi-cylinder internal combustion engine comprising:

a plurality of knock sensors each for sensing vibrations of a corresponding cylinder;

knock determination means for determining, based on the output signals of the knock sensors, whether knocking is taking place in each of the cylinders, and for generating a knock signal for a knocking cylinder in which knocking is taking place;

control means for properly controlling the operations of the respective cylinders, the control means being operable to further perform knock control on the knocking cylinder independently of the other cylinders so as to suppress the knocking therein based on the output signal of the knock determination means;

noise determination means for determining whether the knock signal of the knock determination means results from noise or knocking, the noise determination means being operable to generate a noise signal when it determines that the knock signal results from noise; and knock-control suppression means for suppressing the knock control of the control means on a cylinder for which the knock determination means generates a noise signal.

In one embodiment, the control means includes retard angle control means for properly retarding the ignition timing for the knocking cylinder based on the knock signal.

Preferably, the knock-control suppression means comprises retard-angle-control suppression means for suppressing the ignition timing retard control of the retard angle control means.

In a form, the retard-angle-control suppression means includes first counter means for counting the noise signals for each cylinder. The retard-angle-control suppression means is operable to suppress the retard angle control on a cylinder when the number of noise signals for the cylinder counted by the first counter means exceeds a first predetermined value. In a modified form, the retard-angle-control suppression means may suppress the retard angle control on a cylinder when the number of noise signals for the cylinder successively counted by the first counter means exceeds a predetermined value.

The retard-angle-control suppression means may further include second counter means for counting ignitions for each cylinder. In this case, the retard-angle-control suppression means is operable to clear the number of ignitions for a cylinder counted by the second counter means each time the noise determination means generates a noise signal for the cylinder. The retard-angle-control suppression means further operates to clear the number of noise signals for a cylinder counted by the first counter means when the number of ignitions for the cylinder, which have been counted by the second counter means until the number of noise signals for the cylinder counted by the first counter means reaches a first predetermined value, exceeds a second predetermined value.

Moreover, the retard-angle-control suppression means may further include third counter means for counting ignitions for each cylinder. In this case, the retard-angle-control suppression means is operable to suppress the retard angle control on a cylinder when the number of noise signals for the cylinder, which have been counted by the first counter means until the number of ignitions for the cylinder counted by the third counter means reaches a predetermined value, exceeds the first predetermined value.

According to another aspect of the present invention, there is provided a knock suppression method for a multi-cylinder internal combustion engine having a plurality of knock sensors each for sensing vibrations of a corresponding cylinder. The method comprises the following steps of:

calculating a deviation level corresponding to a knock signal by subtracting a peak threshold from a peak level of the output signal of each knock sensor which occurs upon ignition of a corresponding cylinder;

determining whether the deviation level is a noise level, and generating a knock signal for a knocking cylinder when the deviation level is determined to be a noise level;

determining whether the number of outputs of the noise signal for a cylinder is less than a first predetermined value;

retarding the ignition timing of a cylinder based on the deviation level for the cylinder when the deviation level is not determined to be the noise level or when the number of outputs of the noise signal is determined to be less than the first predetermined value; and suppressing retard-angle control on a cylinder when the number of outputs of the noise signal for the cylinder is greater than the first predetermined value.

The above and other objects, features and advantages of the present invention will become apparent from the following detailed description of a few preferred embodiments of the invention taken in conjunction with the accompanying drawings.

DESCRIPTION OF THE PREFERRED EMBODIMENT

The present invention will now be described in detail with reference to a few preferred embodiments thereof as illustrated in the accompanying drawings.

Figure 1:
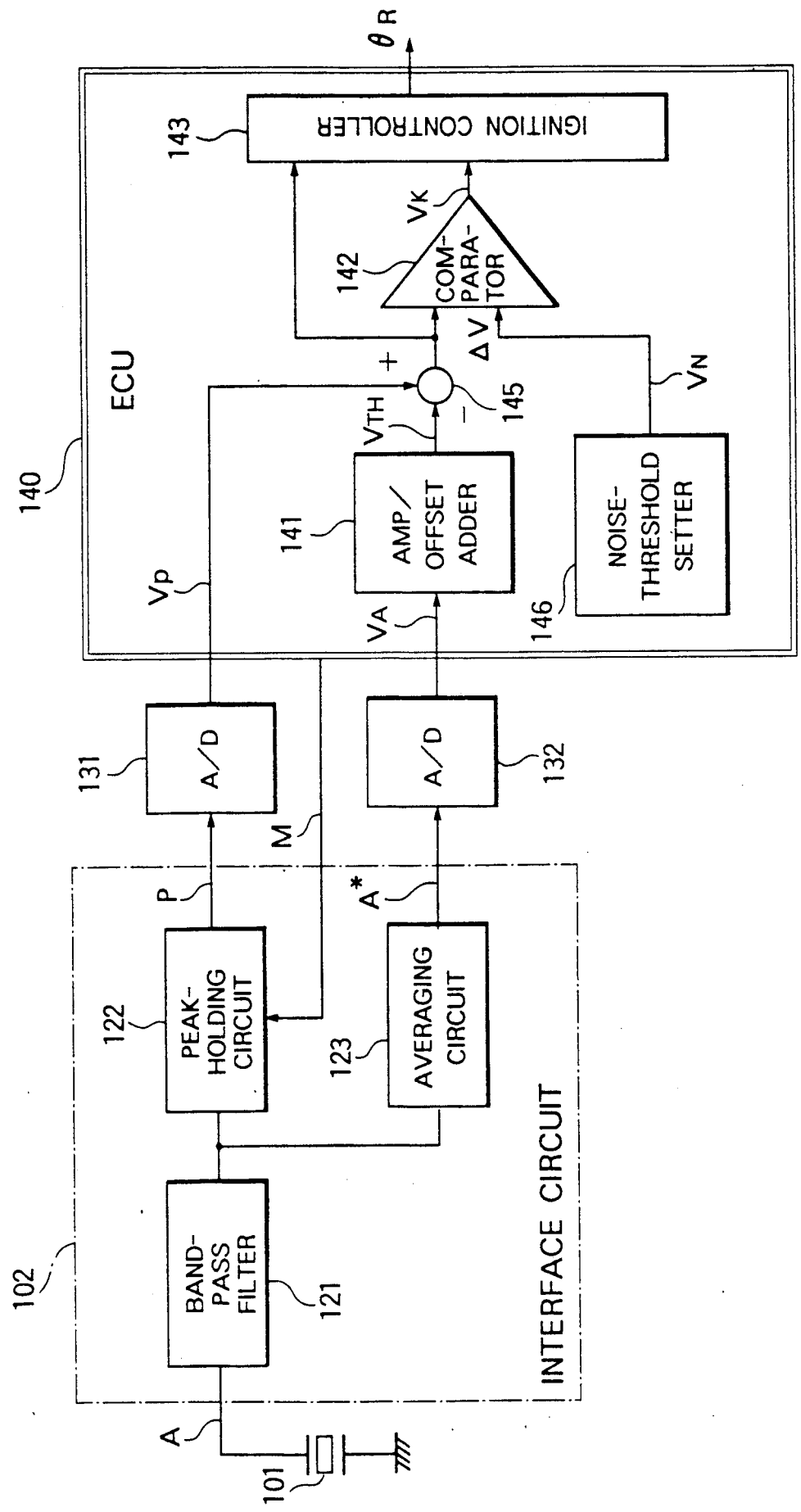
FIG. 1 is a schematic block diagram of a knock suppression apparatus for a multi-cylinder internal combustion engine in accordance with one embodiment of the present invention.

Referring to the drawings and first to FIG. 1, there is shown the general arrangement of a knock suppression apparatus for a multi-cylinder internal combustion engine constructed in accordance with one embodiment of the present invention. The knock suppression apparatus illustrated includes a plurality of knock sensors 101 (only one is illustrated in FIG. 1) in the form of acceleration or vibration sensors, etc., a knock interface circuit 102, a first and a second A/D converter 131, 132, and an electronic control unit (ECU) 140 in the form of a microcomputer.

Figure 2:
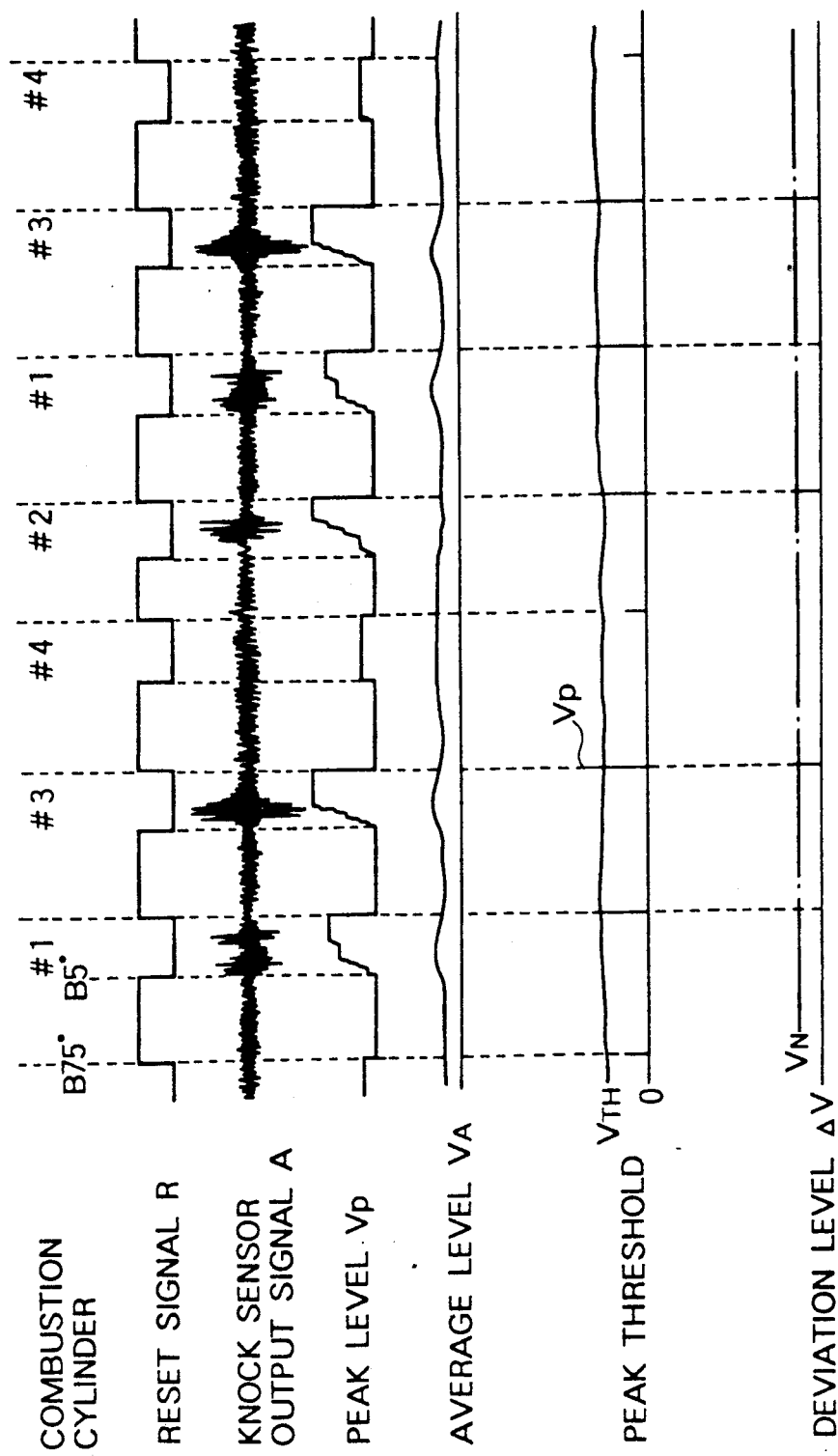
FIG. 2 is a waveform diagram showing the signal waveforms at various portions of the apparatus of FIG. 1 for explaining the operation thereof.

Each of the knock sensors 101 is installed on a corresponding cylinder of a multi-cylinder internal combustion engine for sensing knocking therein and generating an output signal of high frequencies, as illustrated in FIG. 2, for sensing knocking in the respective cylinders.

The knock interface circuit 102 receives the output signals A of the knock sensors 101 and generates a peak level signal P and an average level signal A* upon every ignition of the cylinders. The knock interface circuit 102 comprises a band-pass filter 121 connected at its input terminal to the knock sensors 101 for allowing the passage of a particular frequency band (e.g., around 7 KHz) of the output signal A of each knock sensor 101 which is intrinsic to knocking, a peak-holding circuit 122 having an input terminal coupled to the output terminal of the band-pass filter 121 for generating a peak signal P with an amplitude corresponding to each peak of the output signal of each knock sensor 101 as filtered by the band-pass filter 121, and an averaging circuit 123 connected to receive the output signal of the band-pass filter 121 for generating an average signal A* having a voltage level equal to the average level of the output signal A of each knock sensor 101. The peak-holding circuit 122 also has a reset input terminal onto which a reset signal R is imposed by the microcomputer 140. The reset signal R generated by the microcomputer 140 has, for example, a square wave form, as illustrated in FIG. 2, which has a rising edge occurring at a crank angle (i.e., angular piston position) of 75 degrees before top dead center (BTDC) and a falling edge occurring at a crank angle of 5 degrees before top dead center (BTDC). Thus, the reset signal R fed to the reset input terminal of the peak-holding circuit 122 is at the high level only during a period from 75 degrees BTDC to 5 degrees BTDC which substantially corresponds to the time when there is no knocking in the engine. The peak-holding circuit 122 receives the output signal A of each knock sensor 100 band filtered by the band-pass filter 121 and generates an output signal P in the form of a peak-hold signal having generally stepped wave forms, each of which rises stepwise in response to an increased amplitude of each pulse of the knock sensor output signal and is held at the peak level as long as the reset signal R is at the low level, and falls vertically when the reset signal R changes from the low to the high level.

The first A/D converter 131 receives the output signal P in the form of an analog signal from the peak-holding circuit 122 and converts it into a corresponding digital signal $V_P$. Also, the second A/D converter 132 receives the output signal A* in the form of an analog signal from the averaging circuit 123 and converts it into a corresponding digital signal $V_A$.

The microcomputer 140 comprises a threshold setting means 141 for setting, based on the digital average signal $V_A$, a threshold level $V_{TH}$ for determining a failure in each knock sensor, a subtracter 145 for calculating a difference or deviation $\Delta V$ between the peak-level signal $V_P$ and the peak-threshold signal $V_{TH}$, a noise-threshold setter 146 for generating a noise threshold signal $V_n$, a knock determination means 142 which has a first input terminal connected to the output side of the subtracter 145 and a second input terminal connected to the noise-threshold setter 146 for making a comparison between the deviation $\Delta V$ and the noise threshold signal $V_N$ and determining, based on the result of the comparison, whether knocking is taking place in each cylinder, and a control means 143 in the form of an ignition controller which receives, as input signals, the output signal $\Delta V$ of the subtracter 145 and the output signal Vk of the knock determination means 142 for controlling the operations such as ignition timings of the cylinders so as to suppress knocking therein.

The threshold setting means 141 takes the form of an amp/offset adder which has an input terminal connected to receive the digital output signal $V_a$ of the second A/D converter 132, which is obtained from the analog output signal of the averaging circuit 123 through analog to digital conversion, for amplifying and offset adding it to provide an output signal of a threshold voltage $V_{TH}$ which is to be used as a threshold level for knocking determination.

The knocking determination means 142 takes the form of a comparator which has a first input terminal connected to receive the digital output signal $V_P$ of the first A/D converter 131 and a second input terminal on which the output signal $V_{TH}$ of the threshold level of the amp/offset adder 141 is imposed for making comparison therebetween. The comparator 142 determines that knocking is taking place in a cylinder when a difference Vk between the output signal $V_P$ and the threshold level $V_{TH}$ is greater than zero ($Vk = V_p - V_{th} > 0$).

The ignition controller 143 includes an ignition timing control means for generating, based on the output signal Vk of the comparator 132, an appropriately retarded ignition timing signal $\theta_R$ which is fed to an ignition timing control circuit (not shown) including an ignition coil, a spark plug, etc., so as to control or retard the ignition timing of a cylinder to an appropriate extent for suppressing knocking therein.

Figure 3:
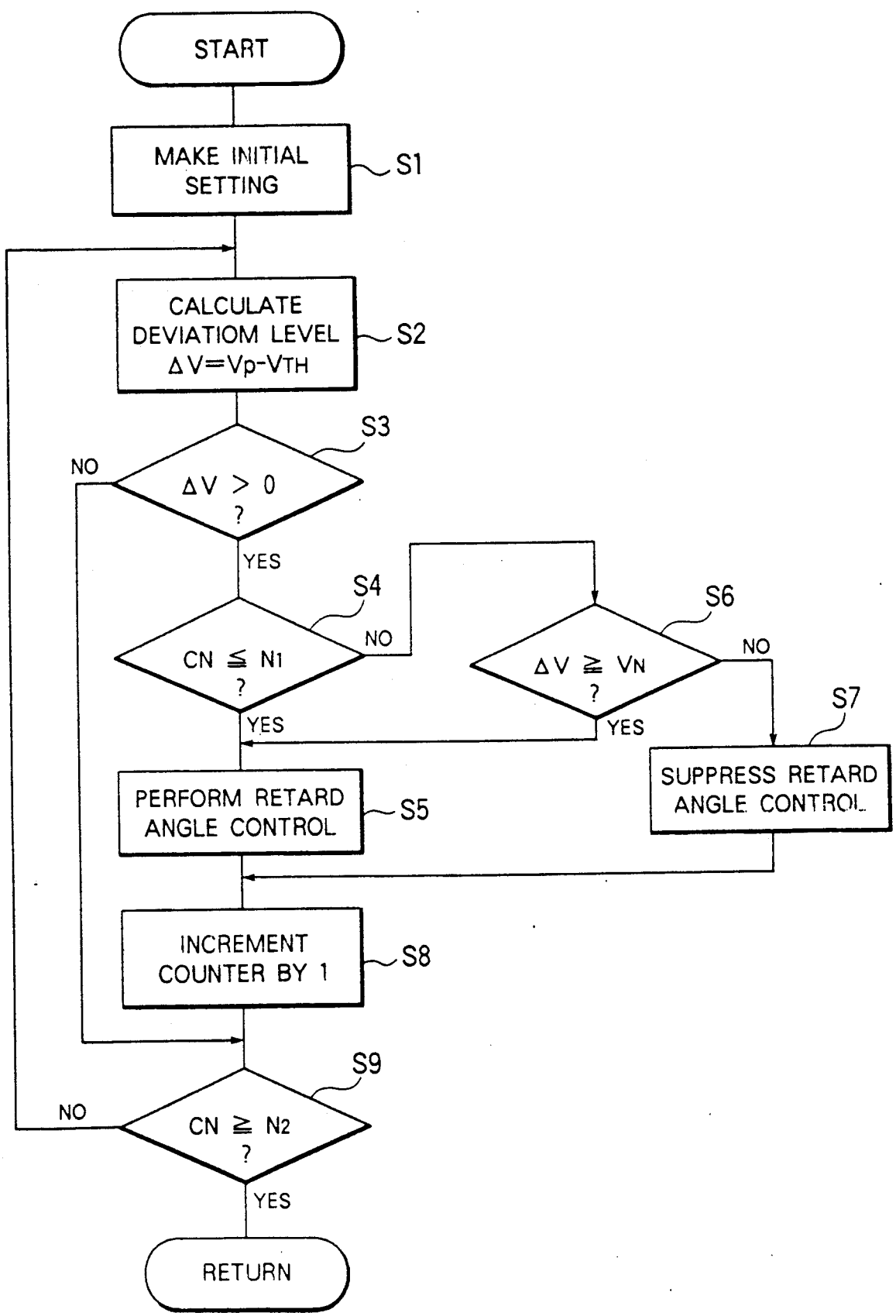
FIG. 3 is a flow chart showing the operating process of the knock suppression apparatus of FIG. 1.

Description is now made of the operation of the knock suppression apparatus as constructed above with particular reference to FIG. 3 which illustrates the operating process of a control program which is stored and executed by the microcomputer 140 for controlling the knock suppression apparatus of the above embodiment.

First, in Step S1, for the purpose of performing noise determination, a counter (not shown) built in the electronic control unit 140 for counting the number of ignitions of each cylinder is reset to zero, and initial settings for the noise threshold $V_N$, a first and a second predetermined number of ignitions $N_1$, $N_2$ ($N_1 < N_2$) used as comparison references for knocking determination are made.

Subsequently, in Step S2, the subtracter 145 calculates the difference or deviation $\Delta V$ between the peak-hold level $V_P$ and the knock threshold $V_{TH}$ based on the output signal of the first A/D converter 131 and the output signal $V_{TH}$ of the amp/offset adder 141. Then in Step S3, it is determined whether the deviation $\Delta V$ thus obtained is positive (i.e., $\Delta V > 0$). If the answer is "YES", the program goes to Step S4 where the present number of ignitions of a cylinder which have thus far occurred is read out from the counter, and it is further determined whether the present number of ignitions thus read out is less than the first number of ignitions $N_1$.

If the present number of ignitions is less than the first number of ignition $N_1$, the program goes to Step S5 where an appropriately retarded ignition angle or timing is calculated based on the deviation $\Delta V$. This is because at the early stage of ignitions, it is difficult to determine whether a peak level $V_P$ is caused by noise or knocking.

On the other hand, if it is determined in Step S4 that the present number of ignitions is equal to or greater than the first predetermined number of ignitions $N_1$, the program goes to Step S6 where the comparator 142 determines whether the deviation $\Delta V$ is equal to or greater than the noise threshold $V_N$. If $\Delta V \geq V_N$, the program goes to Step S5. On the other hand, if $\Delta V < V_N$, the program goes to Step S7 where it is determined that the peak level $V_P$ is caused by noise, and the retard angle control for retarding ignition timing is suppressed or not performed.

After the completion of the retard angle control step S5 and the retard-angle-control suppression step S7, the counter for counting the number of ignitions is incremented by 1 in Step S8. Thereafter, in Step S9, it is determined whether the number of ignitions CN read out from the counter reaches the second predetermined number of ignitions $N_2$. If $CN < N_2$, the program returns to Step S2, but if $CN \geq N_2$, the noise determination routine ends.

The above noise determination routine is independently performed for each cylinder so that even if one of the cylinders is subject to retard angle control at the early stage of ignitions, all the other cylinders are free from such control if unnecessary.

In this manner, at the early stage of ignitions, retard angle control is carried out without fail for a large peak level $V_P$ which exceeds the prescribed peak threshold $V_{TH}$, whereas after the number of ignitions reaches the predetermined first value $N_1$ (e.g., 2 or 3), such control is performed for a peak level $V_P$ which has $\Delta V$ equal to or greater than the predetermined noise threshold $V_N$.

In this connection, it will be understood that if the peak level $V_P$ is due to knocking, retard angle control is effective to suppress the second and subsequent occurrences of the peak level $V_P$. Therefore, it is determined that peak levels $V_P$, which have successively taken place within the first predetermined number of ignitions $N_1$, are due to noise, so that any unnecessary retard angle control can be effectively avoided.

Further, since noise is considered to continue for a predetermined period of time, the counter is reset after the second predetermined value $N_2$ of ignitions of a cylinder have taken place, and it again starts counting the number of ignitions for the next retard angle control.

Although in the above embodiment, the comparator 142 generates an output signal Vk of a constant level when the deviation $\Delta V$ is greater than the noise threshold $V_N$, it can generates an output signal of a variable voltage level which is dependent on the difference in the voltage level between the input signals thereto.

Figure 4:
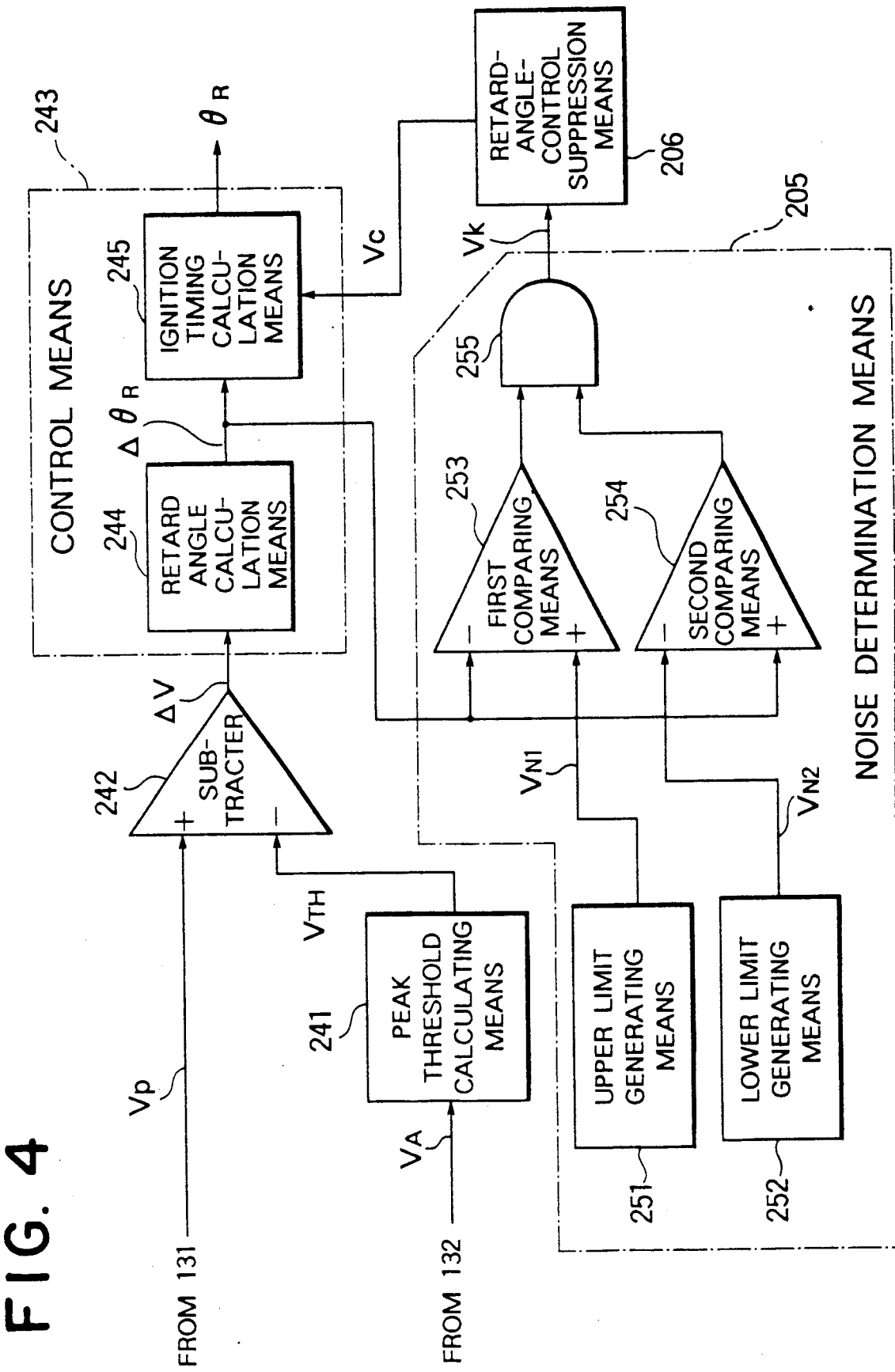
FIG. 4 is a schematic block diagram of major portions of a knock suppression apparatus for a multi-cylinder internal combustion engine in accordance with another embodiment of the present invention.
Figure 5:
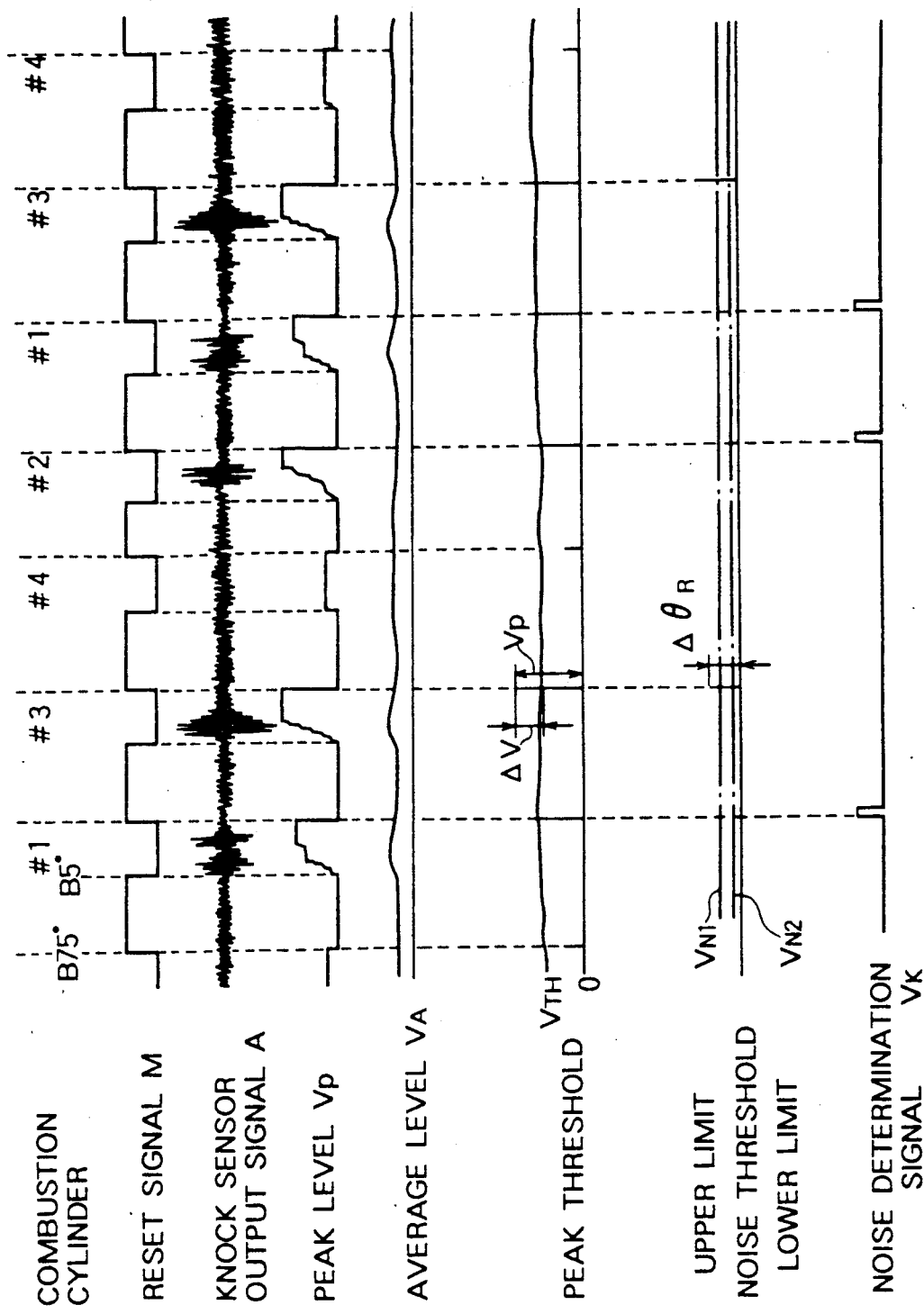
FIG. 5 is a waveform diagram showing the signal waveforms at various portions of the apparatus of FIG. 4 for explaining the operation thereof.
Figure 6:
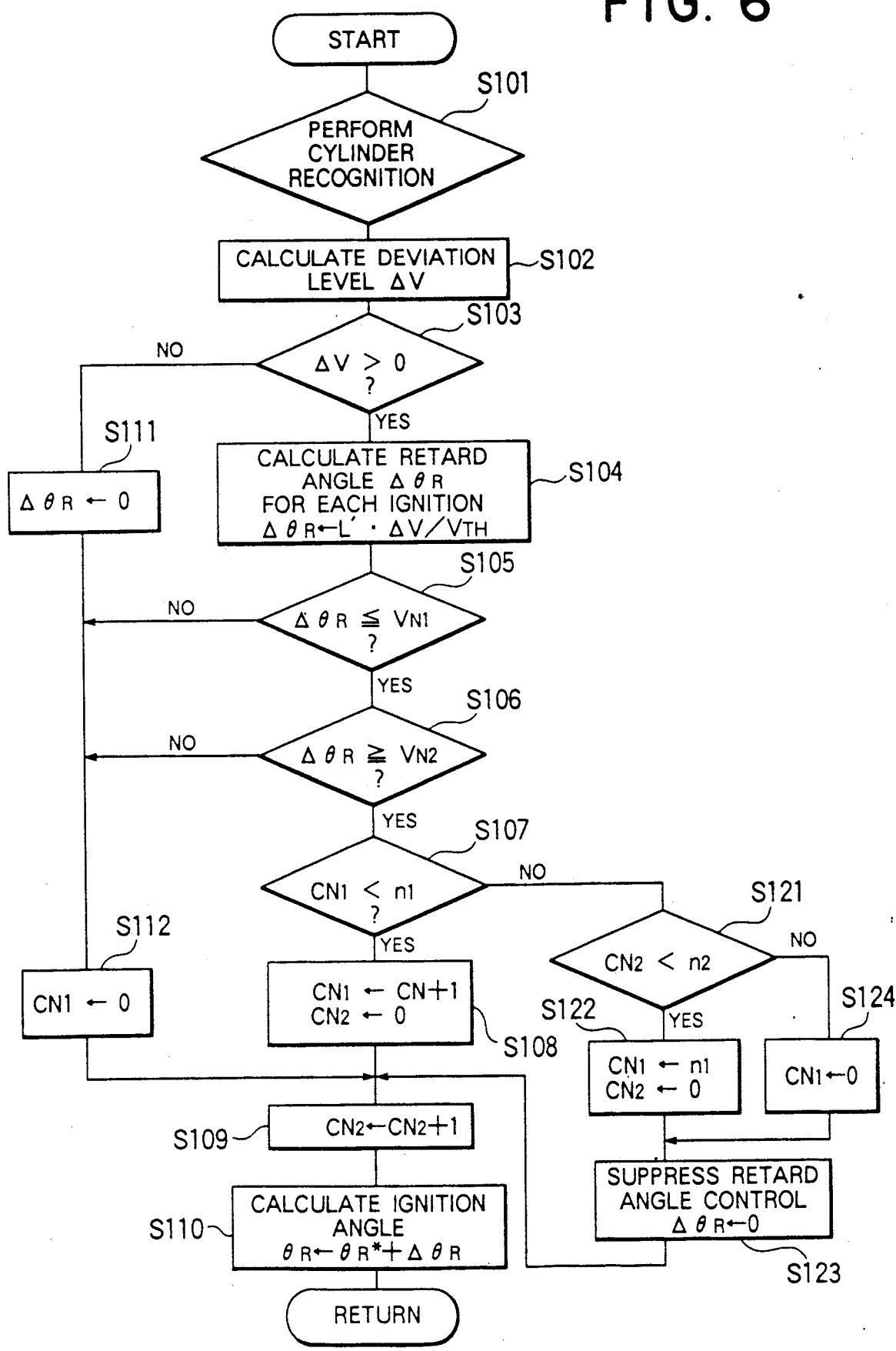
FIG. 6 is a flow chart showing the operating process of the knock suppression apparatus of FIG. 4.
Figure 7:
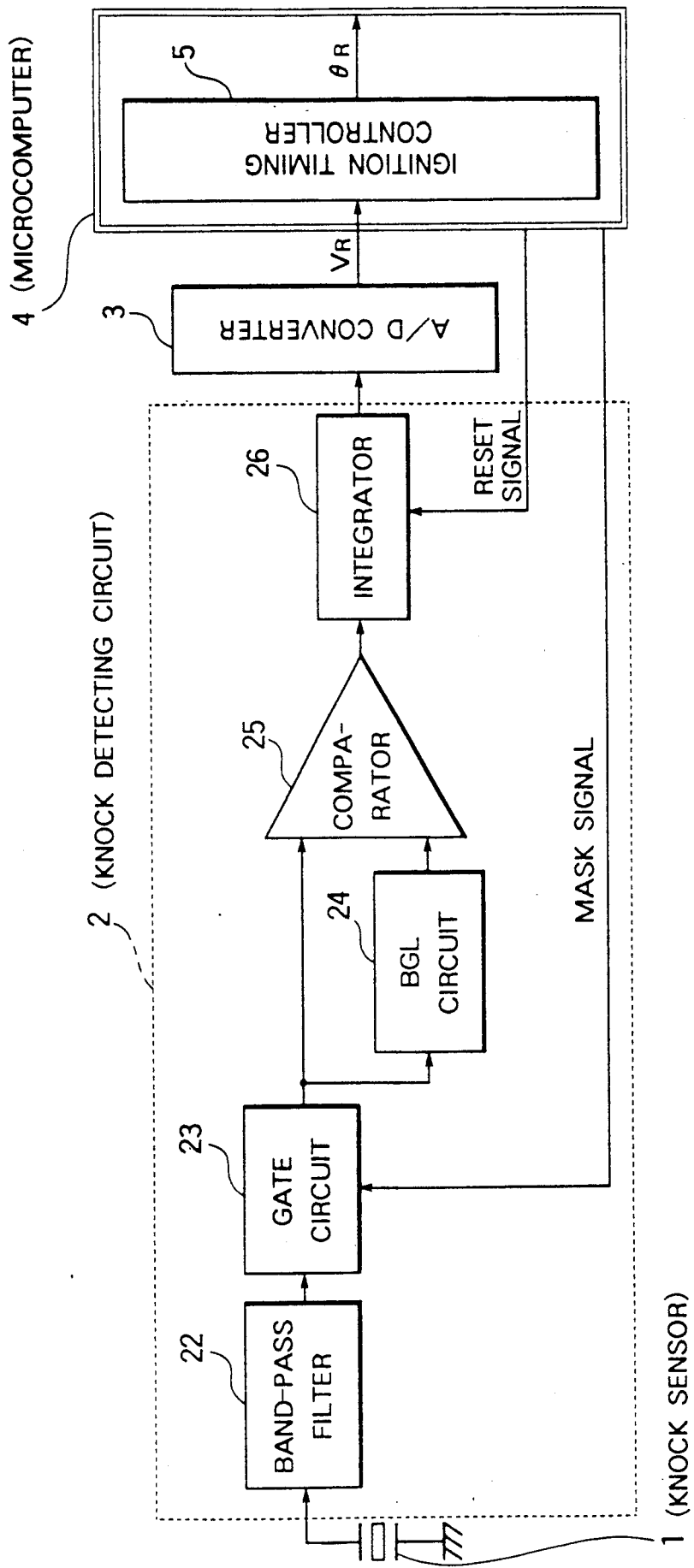
FIG. 7 is a schematic block diagram of a conventional knock suppression apparatus.

FIGS. 4 through 6 show a more concrete embodiment of the present invention. As shown in FIG. 4, in this embodiment, an electronic control unit (ECU) 240 is constructed more concretely than the one 140 in the previous embodiment while the remaining components such as the interface circuit 102 and the first and second A/D converters 131, 132 remain the same as in the previous embodiment.

Specifically, the ECU 240 of this embodiment comprises a knock determination means 242 for determining, based on the output signals of the knock sensors, whether knocking is taking place in each of the cylinders, and for generating a knock signal for a knocking cylinder in which knocking is taking place, a control means 243 for properly controlling the operations of the respective cylinders and performing knock control on the knocking cylinder independently of the other cylinders so as to suppress the knocking therein based on the output signal of the knock determination means 242, a noise determination means 205 for determining whether the knock signal of the knock determination means 242 results from noise or knocking and generating a noise signal when it determines that the knock signal results from noise, and knock-control suppression means 206 for suppressing the knock control of the control means 243 on a cylinder for which the knock determination means 242 generates a noise signal.

The ECU 240 further includes a peak threshold calculating means 241 which receives the output signal $V_A$ of the second A/D converter 132 and calculates, based thereon, a peak threshold signal $V_{TH}$.

The knock determination means 242 comprises a subtracter which receives the output signal $V_P$ of the first A/D converter 131 at its positive input terminal and the peak threshold signal $V_{TH}$ at its negative input terminal and calculates a difference or deviation $\Delta V$ between these signals $V_P$ and $V_{TH}$ and generates an output signal representative thereof.

The noise determination means 205 determines, based on a retard angle $\Delta \theta_R$ for each ignition which is generated by a later-mentioned retard angle calculation means 244 of the control means 243, whether a deviation level $\Delta V$ of the knock signal for each cylinder is due to noise, and it generates a noise signal Vk for a cylinder for which the deviation level $\Delta V$ is determined to be due to noise. The noise determination means 205 includes an upper limit generating means 251 for generating an upper limit $V_{N1}$ for the noise determination threshold, a lower limit generating means 252 for generating a lower limit $V_{N2}$ for the noise determination threshold, a first comparing means 253 for making a comparison between the retard angle $\Delta \theta_R$ and the upper limit $V_{N1}$ and generating a high-level output if $\Delta \theta_R \leq V_{N1}$, and a second comparing means 254 for making a comparison between the retard angle $\Delta \theta_R$ and the lower limit $V_{N2}$ and generating a high-level output if $\Delta \theta_R \geq V_{N2}$, and an AND gate 255 for generating a noise signal Vk if both of the first and second comparing means 253, 254 generate high-level outputs (i.e., $V_{N1} \geq \Delta \theta_R \geq V_{N2}$).

The knock-control suppression means 206 is in the form of a retard-angle-control suppression means which generates a retard-angle-control suppression signal Vc based on the noise signal Vk so as to suppress retard angle control on a cylinder for which the noise determination means 205 generates a noise signal Vk. The retard-angle-control suppression means 206 includes a plurality of counters (not shown) for counting the number of ignitions of each cylinder as well as the number of output pulses of the noise signal Vk. For example, the retard-angle-control suppression means 206 includes a plurality of first counters each counting the number of pulses of the noise signal Vk for a corresponding cylinder, and it operates the retard angle control means 243 so as to suppress retard angle control on a cylinder based on the deviation level $\Delta V$ when the number of pulses of the noise signal Vk for the cylinder reaches a first predetermined value $n_1$ or when a predetermined number of noise signals for a cylinder are successively generated. The retard-angle-control suppression means 206 further includes a plurality of second counters each counting the number of ignitions of a corresponding cylinder, and it operates to clear a second counter each time a noise signal Vk for a corresponding cylinder is generated, and clear a first counter when the number of ignitions of a corresponding cylinder exceeds a second predetermined value $n_2$ at the time the number of pulses of the noise signal Vk for the cylinder reaches the first predetermined value $n_1$. The retard-angle-control suppression means 206 may further include a plurality of third counters each counting the number of ignitions of a corresponding cylinder, and operates to suppress the knock control of the control means 243 on a cylinder based on the deviation level $\Delta V$ when the number of pulses of the noise signal Vk for the cylinder exceeds the first predetermined value $n_1$ within a predetermined number of ignitions of the cylinder.

The control means 243 is in the form of a retard angle control means which operates to properly retard the ignition timing for the knocking cylinder based on the knock signal V from the subtracter 242 and the output signal Vc of the retard-angle-control suppression means 206. The retard angle control means 243 includes a retard angle calculation means 244 for successively calculating an appropriate retard angle $\Delta \theta_R$ for each ignition of a cylinder based on the output signal $\Delta V$ ($V_{TH} - V_p$) of the subtracter 242, and an ignition timing calculation means 245 for successively calculating an appropriate ignition timing for each cylinder based on the retard angle $\Delta \theta_R$ calculated and the last ignition timing $\theta_R^*$ using the following formula:

$$\theta_R = \theta_R^* + \Delta \theta_R. \qquad (1)$$

The operation of this embodiment will now be described in detail with particular reference to the flow chart of FIG. 6 as well as the waveform diagram of FIG. 5.

In the first place, let us assume that the upper limit $V_{N1}$ and the lower limit $V_{N2}$ for noise determination as well as the first and second predetermined reference values $n_1$ and $n_2$ ($n_1 < n_2$) are initially set to be appropriate values, and that the counters in the retard-angle-control suppression means 206 are all cleared.

First, each of the knock sensors 100 detects vibrations of a corresponding one of the cylinders and generates an output signal A for knock determination. As shown in FIG. 5, the output signal A contains a plurality of (four in the illustrated four-cylinder engine) peak pulses which periodically take place in a consecutive manner in accordance with the order of combustion of the cylinders #1, #3, #4 and #2. As is evident from FIG. 5, noise pulses are usually generated by a specific one or two of the cylinders, and the levels of the noise pulses are substantially constant for an arbitrary period of time and are less than the peak levels due to knocking.

The interface circuit 102 generates a peak level signal P and an average level signal $A^*$ each in the form of a pulse upon each ignition of the cylinders, as described in the previous embodiment of FIGS. 1 through 3, and the ECU 240 receives these signals P and $A^*$ which have already been converted from analog to digital form by the first and second A/D converters 131, 132. In this case, the digitized peak level signal $V_P$ is sampled at each first reference piston position (i.e., 75 degrees BTDC) for each cylinder.

First, in Step S101, the ECU 240 recognizes which cylinder has generated the peak level signal $V_P$ and the average level signal $V_A$ inputted thereto, and performs, as a result of such cylinder recognition, a specific control routine for the recognized cylinder. Of course, the ECU 240 performs the retard angle control routine, as illustrated in FIG. 6, for each knocking cylinder.

Then, in Step S102, the subtracter 242 of the ECU 240 subtracts the peak threshold $V_{TH}$ from the peak level $V_P$ to provide a deviation level $\Delta V$ ($\Delta V = V_P - V_{TH}$) for the recognized cylinder.

In Step S103, the retard angle control means 243 of the ECU 240 determines whether the deviation level $\Delta V$ is greater than zero ($\Delta V > 0$).

If $\Delta V > 0$, then in Step S104, for the purpose of retarding the ignition timing of the recognized cylinder, the retard angle calculation means 244 calculates an appropriate retard angle $\Delta \theta_R$ for each ignition of the recognized cylinder based on the deviation level V using the following formula:

$$\Delta \theta_R = L' \times V / V_{TH}$$

where L' is a reflection factor. In this connection, the retard angle $\Delta \theta_R$ is normalized by the peak threshold $V_{TH}$, so an optimum retard angle $\Delta \theta_R$ can be obtained at all times irrespective of variations in magnitude of the peak level $V_P$ and the deviation level $\Delta V$.

On the other hand, in Step S105, the first comparator 253 of the noise determination means 205 compares the retard angle $\Delta \theta_R$ with the noise threshold upper limit $V_{N1}$ for determination of $\Delta \theta_R \leq V_{R1}$ in Step S105, and the second comparator 254 compares the retard angle $\Delta \theta_R$ with the noise threshold lower limit $V_{N2}$ for determination of $\Delta \theta_R \geq V_{N2}$.

Normally, the levels of noise pulses contained in the peak level signal $V_P$ are less than a knock level corresponding to the noise threshold upper limit $V_{N1}$ and greater than a prescribed level corresponding to the noise threshold lower limit $V_{N2}$. Here, the retard angle $\Delta \theta_R$ which is normalized by the peak threshold $V_{TH}$ is employed for comparison, so that highly reliable noise determination can be effected. The first comparator 253 generates a high-level output if $\Delta \theta_R \leq V_{N1}$ whereas the second comparator 254 generates a high-level output if $\Delta \theta_R \geq V_{N2}$. Accordingly, the AND gate 255 generates a high-level noise signal Vk if $V_{N1} \geq \Delta \theta_R \geq V_{N2}$.

In Step S107, the retard angle suppression means 206 reads the first counter which counts the number of output pulses of the noise signal Vk for the recognized cylinder, and compares the reading $CN_1$ of the first counter representative of the counted number of output pulses of the noise signal Vk with the first predetermined value $n_1$ (e.g., 2 or 3) so as to determine whether $CN_1 < n_1$.

In Step S108, if it is determined to be $CN_1 < n_1$, the first counter is incremented by 1. At the same time, the number of output pulses of the noise signal Vk is calculated, and the second counter, which counts the number of normal ignitions of the recognized cylinder, is cleared. At this time, the retard-angle-control suppression means 206 generates no retard-angle-control suppression signal Vc so that the ignition timing calculation means 245 of the retard angle control means 243 calculates an appropriately retarded ignition angle or timing R for the recognized cylinder using formula (1) above while taking account of the retard angle $\Delta \theta_R$ which is calculated based on the deviation level $\Delta V$. In other words, even if it is determined that the deviation level $\Delta V$ is substantially equal to the noise level, retard angle control of retarding the ignition timing of the recognized cylinder is not suppressed until the number of output pulses of the noise signal Vk reaches the first predetermined value $n_1$. This is because at the early period of counting the number of ignitions, it is difficult to determine whether the deviation level $\Delta V$ of such a magnitude is due to noise or actual knocking, and hence from the standpoint of safety, that deviation level $\Delta V$ is taken as due to knocking. Usually, if the peak level $V_P$ results from knocking, retard angle control is effective to suppress or reduce the peak level $V_P$. Accordingly, it is ensured that a series of pulses of the noise signal Vk successively generated until the number thereof reaches the first predetermined value $n_1$ are considered to be an indication of incorrect determination due to noise.

Subsequently, in Step S109, the second counter for the recognized cylinder is incremented by 1, and then in Step S110, the ignition timing calculation means 245 calculates an appropriately retarded ignition timing for the recognized cylinder based on the last ignition timing $\theta_R^*$ and the above obtained retard angle $\Delta \theta_R$ using formula (1) above.

On the other hand, if it is determined to be $\Delta V \leq 0$ in Step S103, the program goes to Step S111 where the retard angle $\Delta \theta_R$ is set to be zero, and the first counter is cleared in Step S112 and the second counter is incremented by 1 in Step S109.

Further, if $\Delta \theta_R > V_{N1}$ in Step S105 or if $V_{N2} > \Delta \theta_R > 0$ in S106, the first counter is then cleared in Step S112 and the second counter is incremented by 1 in Step S109. Thereafter, in Step S110, an appropriately retarded ignition timing $\theta_R$ is calculated so that it is reflected on the retard angle control of the recognized cylinder based on the deviation level $\Delta V$.

At this time, the first counter for the recognized cylinder never reaches the first predetermined value $n_1$ as long as a series of pulses of the noise signal Vk are not successively generated at least the first predetermined number of times $n_1$ since the first counter was once cleared in Step S112. Therefore, the retard angle control on the recognized cylinder based on the retard angle $\Delta \theta_R$ continues.

In contrast, if in Step S107, it is determined to be $CN_1 \geq n_1$ as a result of the noise signal Vk being successively generated more than the first predetermined number of times $n_1$, the retard-angle-control suppression means 206 outputs a retard-angle-control suppression signal Vc to the ignition timing calculation means 245 and performs the following Steps S121 through 124.

Specifically, in Step S121, the retard-angle-control suppression means 206 reads the second counter and compares the reading $CN_2$ of the second counter with the second predetermined value $n_2$ so as to determine whether $CN_2 < n_2$.

If $CN_2 < n_2$, the program goes to Step S122 where the first counter is clipped to the first predetermined value $n_1$ and the second counter is cleared. Then in Step S123, the retard angle $\Delta \theta_R$ is set to zero, and thereafter the control program goes to Step S109.

On the other hand, if $CN_2 \geq n_2$, the program goes to Step S124 where the first counter is cleared, and then in Step S123, the retard angle $\Delta \theta_R$ is set to zero.

Due to the Step S122 of clipping the first counter, the program goes from Step S107 to Step S121 when a noise signal Vk is generated immediately after the clipping of the first counter. Accordingly, as long as the retard-angle-control suppression Step S123 is not successively performed the second predetermined number of times $n_2$, retard angle control continues to be suppressed each time a noise signal Vk is generated. Since the first counter is cleared in Step S124 when it reaches the second predetermined number of times $n_2$, the program goes from Step S107 to Step S108 wherein the second counter is also reset without execution of the retard-angle-control suppression routine comprising Steps S121 through S123.

Since engine noise generally stops or disappears after the lapse of a predetermined period of time, there will be no problem even if the first and second counters are reset at the instant when the second predetermined number $n_2$ of retard-angle-control suppression operations have been carried out.

In this manner, the retard angle control routine of FIG. 6 is repeatedly executed every ignition of each cylinder independently of the remaining cylinders so that only a specific cylinder(s) in which knocking is taking place is subject to the retard angle control with the remaining cylinders being controlled in a normal manner without any retard angle control. Further, at the early stage of engine cranking or ignition starting or at the beginning of generation of the noise signal Vk, retard angle control is performed without fail against a peak level signal $V_P$ of a great magnitude which exceeds the peak threshold $V_{TH}$, and it is then suppressed or stopped at the instant when the number of noise signal pulses Vk successively generated exceeds the first predetermined value $n_1$.

Although in the second embodiment, retard angle control for a knocking cylinder is suppressed or stopped when noise signal pulses Vk for the cylinder are successively generated over the first predetermined number of times $n_1$, Step S112 may be omitted and the retard angle control on the cylinder can be suppressed or stopped when the total number of noise signal pulses Vk thus far generated reaches the first predetermined value $n_1$. In this case, the retard-angle-control suppression means 206 may be provided with a plurality of third counters each counting the number of ignitions of a corresponding cylinder, so that it suppresses retard angle control on a cylinder when the first predetermined number $n_1$ of noise signal pulses Vk are generated within a predetermined number of ignitions of the cylinder.

Furthermore, although in the above-described second embodiment, two first and second comparators 253, 254, which compare the deviation level $\Delta V$ with the upper limit $V_{N1}$ and the lower limit $V_{N2}$, respectively, are provided for determining whether the deviation level $\Delta V$ is due to noise or knocking, the second comparator 254 may be omitted. In this case, the noise determination means 205 can be constructed such that it generates a noise signal Vk when the deviation level $\Delta V$ is less than the upper limit $V_{N1}$.

What is claimed is:

1. A knock suppression apparatus for a multi-cylinder internal combustion engine comprising:
 a plurality of knock sensors each for sensing vibrations of a corresponding cylinder;
 knock determination means for determining, based on the output signals of said knock sensors, whether knocking is taking place in the cylinders, and for generating a knock signal for a knocking cylinder in which knocking is determined to be taking place;
 control means for properly controlling the operations of the respective cylinders, said control means being operable to further perform knock control on the knocking cylinder independently of the other cylinders so as to suppress the knocking therein based on the output signal of said knock determination means;

noise determination means for determining whether the knock signal of said knock determination means results from noise or knocking, said noise determination means being operable to generate a noise signal when it determines that the knock signal results from noise; and knock-control suppression means for suppressing the knock control of said control means on a cylinder for which said knock determination means generates a noise signal.

2. A knock suppression apparatus for an internal combustion engine as claimed in claim 1, wherein said control means includes retard angle control means for properly retarding the ignition timing for the knocking cylinder based on the knock signal.

3. A knock suppression apparatus for an internal combustion engine as claimed in claim 2, wherein said knock-control suppression means comprises retard-angle-control suppression means for suppressing the ignition timing retard control of said retard angle control means.

4. A knock suppression apparatus for an internal combustion engine as claimed in claim 3, wherein said retard-angle-control suppression means includes first counter means for counting the noise signals for each cylinder, said retard-angle-control suppression means being operable to suppress the retard angle control on a cylinder when the number of noise signals for the cylinder counted by said first counter means exceeds a first predetermined value.

5. A knock suppression apparatus for an internal combustion engine as claimed in claim 3, wherein said retard-angle-control suppression means includes first counter means for counting the noise signals for each cylinder, said retard-angle-control suppression means being operable to suppress the retard angle control on a cylinder when the number of noise signals for the cylinder successively counted by said first counter means exceeds a predetermined value.

6. A knock suppression apparatus for an internal combustion engine as claimed in claim 4 or 5, wherein said retard-angle-control suppression means includes second counter means for counting ignitions for each cylinder, said retard-angle-control suppression means being operable to clear the number of ignitions for a cylinder counted by said second counter means each time said noise determination means generates a noise signal for the cylinder, said retard-angle-control suppression means being further operable to clear the number of noise signals for a cylinder counted by said first counter means when the number of ignitions for the cylinder, which have been counted by said second counter means until the number of noise signals for the cylinder counted by said first counter means reaches a first predetermined value, exceeds a second predetermined value.

7. A knock suppression apparatus for an internal combustion engine as claimed in claim 4 or 5, wherein said retard-angle-control suppression means includes third counter means for counting ignitions for each cylinder, said retard-angle-control suppression means being operable to suppress the retard angle control on a cylinder when the number of noise signals for the cylinder, which have been counted by said first counter means until the number of ignitions for the cylinder counted by said third counter means reaches a predetermined value, exceeds the first predetermined value.

8. A knock suppression method for a multi-cylinder internal combustion engine having a plurality of knock sensors each for sensing vibrations of a corresponding cylinder, said method comprising the following steps of:

calculating a deviation level corresponding to a knock signal by subtracting a peak threshold from a peak level of the output signal of each knock sensor which occurs upon ignition of a corresponding cylinder;

determining whether the deviation level is a noise level, and generating a knock signal for a knocking cylinder when the deviation level is determined to be a noise level;

determining whether the number of outputs of the noise signal for a cylinder is less than a first predetermined value;

retarding the ignition timing of a cylinder based on the deviation level for the cylinder when the deviation level is not determined to be the noise level or when the number of outputs of the noise signal is determined to be less than the first predetermined value; and suppressing retard-angle control on a cylinder when the number of outputs of the noise signal for the cylinder is greater than the first predetermined value.

* * * * *